United States Patent
Stephens et al.

(10) Patent No.: US 6,638,354 B2
(45) Date of Patent: Oct. 28, 2003

(54) PRECIPITATED SILICAS, SILICA GELS WITH AND FREE OF DEPOSITED CARBON FROM CAUSTIC BIOMASS ASH SOLUTIONS AND PROCESSES

(75) Inventors: Douglas K. Stephens, Dickinson, TX (US); Clyde W. Wellen, Houston, TX (US); Jeffrey B. Smith, Plano, TX (US); Kenneth F. Kubiak, Dallas, TX (US)

(73) Assignees: Agritec, Inc., Houston, TX (US); Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 10/060,761

(22) Filed: Jan. 30, 2002

(65) Prior Publication Data

US 2003/0097966 A1 May 29, 2003

Related U.S. Application Data

(60) Division of application No. 09/540,568, filed on Mar. 31, 2000, now Pat. No. 6,375,735, which is a continuation-in-part of application No. 09/159,809, filed on Sep. 23, 1998, now Pat. No. 6,114,280, which is a continuation-in-part of application No. 08/977,524, filed on Nov. 24, 1997, now Pat. No. 5,858,911, which is a division of application No. 08/677,875, filed on Jul. 10, 1996, now Pat. No. 5,714,000, which is a continuation-in-part of application No. 08/642,925, filed on May 6, 1996, now abandoned.

(51) Int. Cl.$^7$ .................. C01B 33/12; C01B 33/142
(52) U.S. Cl. .................. 106/624; 106/600; 106/406; 106/407; 106/482; 106/492; 423/335; 423/339; 428/403; 502/405; 502/407

(58) Field of Search .................. 106/624, 406, 106/407, 482, 492, 600; 423/335, 339; 428/403; 502/405, 407

(56) References Cited

U.S. PATENT DOCUMENTS

| | | | | |
|---|---|---|---|---|
| 3,959,007 A | * | 5/1976 | Pitt | 106/406 |
| 5,782,982 A | * | 7/1998 | Farone et al. | 127/37 |
| 5,833,940 A | * | 11/1998 | Reiber et al. | 423/334 |
| 6,332,977 B1 | * | 12/2001 | Janecek | 210/96.1 |

* cited by examiner

*Primary Examiner*—Michael Marcheschi
(74) *Attorney, Agent, or Firm*—James F. Weiler

(57) ABSTRACT

Disclosed are amorphous precipitated silicas, silica gels, and amorphous carbons derived from biomass and methods of producing them with and without adhered or deposited amorphous carbons produced by acidifying a caustic silicate solution produced by caustic digestion of biomass ash containing silica with and without activated carbon, the ash being obtained from thermal pyrolysis of the biomass, the acidifying effective to produce a slurry of the precipitated silica and silica gels with and without adhered or deposited amorphous carbon, and separated from the slurry the precipitated silicas and silica gels with and without the adhered or deposited amorphous carbons. The properties of the precipitated silica with adhered or deposited carbon being within the range as utilized in rubber compositions thereby avoiding the blending of silica and carbon components for such use. The precipitated silicas and silica gels without adhered or deposited carbon having metal contaminants present in low concentrations which when used in formulation of chemical-mechanical-planerization slurries used in polishing silicon wafers in the manufacture of computer chips and other electronic devices do not contaminate the wafer and final chip product and the other electronic devices.

4 Claims, No Drawings

PRECIPITATED SILICAS, SILICA GELS WITH AND FREE OF DEPOSITED CARBON FROM CAUSTIC BIOMASS ASH SOLUTIONS AND PROCESSES

CROSS-REFERENCE TO RELATED APPLICATIONS

This application is a divisional application of U.S. application Ser. No. 09/540,568 filed Mar. 31, 2000, U.S. Pat. No. 6,375,735, which is a continuation-in-part of U.S. application Ser. No. 09/159,809, filed Sep. 23, 1998, U.S. Pat. No. 6,114,280, which is a continuation-in-part application of U.S. application Ser. No. 08/977,524, filed Nov. 24, 1997, now U.S. Pat. No. 5,858,911, which is a divisional application of U.S. application Ser. No. 08/677,875, filed Jul. 10, 1996, now U.S. Pat. No. 5,714,000, which is a continuation-in-part application of U.S. application Ser. No. 08/642,925, filed May 6, 1996, abandoned.

FIELD OF THE INVENTION

The present invention relates to precipitated silicas or silica gels, wherein each silica type has adhered or deposited activated carbon or free of carbon, from a caustic biomass ash solution and their production.

BACKGROUND OF THE INVENTION

Commercially available precipitated silicas are produced through an acidulation process utilizing a caustic silicate solution, such as sodium silicate solution, with a mineral acid, such as sulfuric acid. Commercially available caustic silicate solutions are conventionally made by fusing high purity soda ash and silica sand in furnaces at temperatures of 1300° to 1500° C. and higher to produce a solid glass. The silicate solution is made by dissolving the glass with steam and hot water. This is the foundation of all commercial processes for making sodium or other soluble silicate solutions today. Both processes are very energy intensive, thus very expensive, and the silicates generally contain metal contaminants found in the earth in amounts from about 500 to 10,000 ppm. Processes for producing precipitated silicas are described in detail in U.S. Pat. Nos. 2,657,149; 2,940,830; 4,157,920; 4,495,167; and 4,681,750, the entire disclosures of which are incorporated herein by reference, including the processes for producing precipitated silicas and the properties of the product. In general, acid and silicate solutions are added to a reactor and by manipulation of the process conditions, the chemical and structural properties can be controlled. After completion of the precipitation reaction, the solid precipitate is filtered, washed to remove soluble byproducts, dried and milled to the desired size.

Silica gels, another form of amorphous silica with slightly different properties, are produced in a similar manner as previously described, however, in lower pH solutions. The process for commercially produced silica gels, entails treating a solution of soluble metal silicate, usually sodium silicate, with a strong mineral acid such as sulfuric or hydrochloric acid. Since the gel phase does not settle out, silica gel is customarily described as a non-precipitated, homogenous mixture of colloidal amorphous silica particles. The end product is then washed to remove soluble salts, dried, and reduced to a suitable particle size range. There are generally two types of silica gels, namely, hydrogels and aerogels. Hydrogels are prepared as previously described and aerogels are usually prepared from unrefined hydrogels by displacing the water with an alcohol, which is recovered during the drying process. Silica gel, a glassy material, has immense internal pore area, giving it the capacity to absorb large quantities of moisture as well as other substances.

Precipitated silicas with added carbon adhered or deposited on them are utilized for various rubber applications, which require high strength and abrasion resistance, such as tires and industrial products. The current methodology for using combinations of silica and carbon as reinforcing agents in rubber entails blending the solid components into the rubber composition, which usually requires the addition of dispersants and coupling agents to achieve a homogenous mixture. In practice, the carbon is normally selected from carbon blacks that are commercially available and conventionally used in tires, treads, hoses, etc. Examples include carbon blacks with ASTM designated N-numbers, which are well known to those skilled in the rubber compounding art. These carbon blacks are produced commercially by subjecting heavy residual oil feedstock to extremely high temperatures in a carefully controlled combustion process. This production process is very energy and labor intense, which results in high manufacturing costs.

In practice, the commonly used siliceous compounds (silicas) employed in rubber compounding applications are typically precipitated silicas, such as those obtained by the acidification of soluble silicates, i.e., sodium silicate. The preferred silicas include those marketed by AKZO, PPG, DuPont, Rhone-Poulenc, Huber and Degussa. Also, coupling agents capable of reacting with both the silica surface and the rubber elastomer are utilized to cause the particulate precipitated silica to have a reinforcing effect on the rubber.

As mentioned previously, precipitated silicas and silica gels are utilized as reinforcing fillers in many applications, particularly, in the rubber industry. For various rubber applications, which require high strength and abrasion resistance, such as tires and industrial products, a combination of silica and amorphous carbonaceous components are utilized. Carbon black and silica with or without a coupling agent are commonly used as reinforcing fillers for various rubber products, including the treads, undertreads, and sidetreads of tires; industrial hoses, conveyor belts, rolls; rubber shock absorbers; and the like. The use of silica and carbon as reinforcing fillers for elastomers, including sulfur curable rubber, is well known to those skilled in such art.

U.S. Pat. No. 5,610,216 discloses a rubber composition with the combination of silica and carbon black utilized as reinforcing filler, with a ratio of silica to carbon black in the range of 3/1 (75% silica and 25% carbon) to about 30/1 (96.77% silica and 3.23% carbon). The rubber composition comprises about 25 to about 100 parts of reinforcing filler composed of silica and carbon black per 100 parts by weight of rubber (phr).

As previously mentioned, carbon black is produced commercially by subjecting heavy residual oil feedstock to extremely high temperatures in a carefully controlled combustion process. By adjusting conditions in the combustion process, dozens of commercial grades with varying structure and particle size, are produced. Carbon black structural properties such as, surface area and pore volume, are evaluated and measured using methods similar to those utilized for precipitated silicas and silica gels. The principle measurement of a carbon black's structure, i.e., the degree of interlinkage between particles, is usually determined by the DBP (dibutyl phthalate) oil absorption in accordance with ASTM D2414, with values in milliliters absorbed per 100 grams of carbon (ml/100 g). The measurement of surface area is customarily performed by a BET (Brunauer, Emmett, Teller) nitrogen adsorption test method, ASTM D3707 or ASTM D4820 with values in square meters per gram of carbon ($m^2/g$). Some manufacturers use ASTM D3765, CTAB (cetyltrimethylammonium bromide) adsorption for surface area, which results in values in $m^2/g$ identical to the BET values, in most cases. Also, some manufacturers utilize ASTM D1510, Standard Test Method for Carbon Black-Iodine Adsorption Number, as a measurement of surface area. For example, a higher Iodine Number, expressed in mg/g, is indicative of smaller particle size and higher surface area, which typically indicates a better reinforcing carbon black for rubber elastomers.

Iodine Numbers and DBP Numbers together with ASTM designated N– numbers for carbon blacks, may be found in *The Vanderbilt Rubber Handbook, 13th Edition,* (1990). The DBP number is indicative of structure with a higher number indicating a higher structure and usually larger aggregate size. The BET nitrogen adsorption number is indicative of surface area with a higher number indicating a higher surface area and, usually, a smaller particle size.

U.S. Pat. Nos. 5,168,106; 5,679,728; and 5,798,405 disclose carbon blacks suitable for the aforementioned uses, with structure properties as follows: DBP (dibutylphthalate) Adsorption Numbers ranging from 80 to 135 ml/100 g, BET Nitrogen Adsorption Numbers ranging from 20 to 300 mg/g, and Iodine Numbers ranging from 25 to 300 mg/g.

U.S. Pat. No. 5,807,494 discloses a silica gel composition with a carbonaceous component attached to a gel component. The carbonaceous component may be selected from the group consisting of: carbon blacks, carbon fibers, activated carbons and graphite carbons. If necessary, the carbonaceous component may be modified so that it will attach to the gel component, thereby, increasing its water dispersibility. Suitable gel components for use in the gel compositions include metal oxide gels such as silica gels, titania gels, alumina gels and the like. The amount of carbonaceous component included in the gel composition will depend on the intended end use. Generally, amounts of 1 to 99%, by weight of the carbonaceous component, may be utilized in the gel composition. If gel compositions with lower bulk density are desirable, then amounts of 1 to 50%, by weight, of the carbonaceous component are utilized. If higher bulk density gels are desirable, 50 to 99%, by weight, of the carbonaceous component are utilized. The gel compositions including carbonaceous components may be utilized in applications known to those of ordinary skill in the art, which include the following: Insulation applications, including thermal, electrical, and acoustical insulation; particulate additive applications, including thickeners in pigments, inks, and food products; flatting agents in paints and coatings; fillers in cements, adhesives, and rubber compositions; reinforcing agents in polymers and natural or synthetic rubber compositions; adsorbents for liquid, gas or vapor adsorption processes; catalyst supports for powdered metal or metal oxide catalytic materials; membranes for selective liquid, gas or vapor separations; filters for filtration of particulates; radiation detectors; heat resistant coatings as in thermal barrier coatings; and low dielectric materials.

Gel precursors, suitable for use in the gel composition of the U.S. Pat. No. 5,807,494, include metal oxide precursors known in the art, such as: $SiO_2$ in alkoxide, sodium silicate and colloidal forms; $TiO_2$ in alkoxide and colloidal forms; $Al_2O_3$ in alkoxides, colloidal, sodium aluminate and salts forms. The choice of a particular precursor is made based on the type of gel desired. As will be recognized by those of ordinary skill in the art, whether a particular gel composition is desirable for use in a particular application will depend in the characteristics of the gel composition, such as amount of carbonaceous material incorporated and the bulk density of the composition.

Examples 23–28 of U.S. Pat. No. 5,807,494 are directed to silica gels produced from a sodium silicate precursor and less than or equal to 50%, by weight (solids), of a carbonaceous component. Three carbon blacks were used in these examles with the properties listed in Table 1, page 10 as: Nitrogen surface areas (ASTM D3037) from 24 to 560 $m^2/g$, DBP oil absorption (ASTM D2414) from 70 to 132 ml/100 g and average primary particle size (ASTM D3849) from 16 to 130 nanometers. Prior to initiating gel formation, a specific amount of a particular carbon black was added to a sol (a liquid colloidal suspension or solution) consisting of commercially available sodium silicate ($SiO_2/Na_2O$ ratio of 3.22:1) and 2M sulfuric acid, with a pH of about 3. Gelation was initiated by controlled addition of 1M sodium hydroxide until the pH of the sol increased to about 5. After washing free of salts, solvent exchanging, and drying, representative samples were evaluated by a rub-off technique and scanning electron microscope (SEM) photographs, to determine whether the carbonaceous material is attached to the gel component.

U.S. Pat. No. 5,679,728 discloses a carbon black having silica adhered to or deposited on the surface thereof (referred to as "silica surface-treated carbon black") utilized in a rubber composition for tire treads, undertreads, and side treads, which gives a low fuel consumption and superior durability, without reducing the braking performance and other tire performance. Also, disclosed is to provide a silica surface-treated carbon black which suppresses a rise in the electrical resistance which is a defect of silica, and improves the dispersibility. The silica-treated carbon black preferably has a nitrogen specific surface area ($N_2SA$) of 20 to 300 $m^2/g$ and a DBP oil adsorption of 90 to 180 ml/100 g. The silica surface-treated carbon black was prepared by the following method. A carbon black (DBP adsorption of 115 to 119 ml/100 g) slurry, prepared by an ordinary method, was warmed to 90° C., then diluted JIS No. 3 sodium silicate was added over 4 hours by a constant delivery pump, the pH was maintained at 5 to 10 by dilute sulfuric acid and an aqueous solution of sodium hydroxide, whereby silica was deposited on the surface of the carbon black. Next, the pH was adjusted to 6 and the solution was allowed to stand for 6 hours, then was filtered, rinsed, and dried to obtain the desired substance. The content of the silica was changed by adjusting the amount of sodium silicate added.

The content of the silica in the silica surface-treated carbon black was found analytically and the properties, including nitrogen specific surface area and the iodine adsorption were determined. For silica surface-treated carbon samples prepared in the above manner, the silica content ranged from 2 to 74 wt %; the nitrogen specific surface area ranged from 94 to 193 $m^2/g$ and the iodine adsorption ranged from 2 to 137 mg/g. Various rubber compositions for tire tread, undertread, cap tread, and side tread uses were prepared using the silica surface-treated carbon black, then tested and the results compared to those obtained from rubber compositions compounded with normal carbon black and silica reinforcements. The results clearly showed the rubber compositions with silica surface-treated carbon black provided an excellent grip and low rolling resistance. Further, the electrical resistance was reduced and the dispersion of the silica surface-treated carbon black in the rubber composition was improved.

U.S. Pat. No. 5,916,934 discloses an elastomeric compound including an elastomer and a silica coated carbon black, and optionally including a coupling agent. This patent teaches a carbon black coated with silica, is expected to provide advantages over carbon, silica, or mixtures thereof in an elastomer. While any carbon black may be used, the desirable properties are determined by analytical methods know in the art. These properties include: particle size and specific surface area; aggregate size, shape, and distribution; and chemical and physical properties of the surface. Furthermore, examples of useful silicas include: silica, precipitated silica, amorphous silica, vitreous silica, fumed silica, fused silica, silicates such as aluminosilicates, and other Si-containing fillers such as clay, talc, wollastonite, and the like. Silicas are commercially available from such sources as Cabot Corporation, PPG Industries, Rhone-Poulenc, and Degussa AG.

From the prior art, it is apparent that precipitated silicas, silica gels, and carbons used, singularly or in some combination, need to possess certain properties relating to structural characteristics, surface area, porosity, adsorption and absorption, surface activity, wetting characteristics, dispersibility in aqueous solutions, and bulk density levels. For example, silicas combined with carbons as reinforcing fillers in rubber products, elastomers, and other polymers, generally have higher surface areas and oil absorption values. Another important feature for these uses is dispersibility in the aqueous rubber compositions. Several of the aforementioned patents teach that the dispersibility of the silica-carbon components is enhanced by using silica surface-treated carbon black, carbonaceous components attached to the silica gel component, silica coated carbon black, and silica coupling agents. While the silica in the rubber reinforcing component does not necessarily have to by physically or chemically bonded to the surface of the carbon black, it is advantageous for the silica to be adhered to or deposited on the carbon black surface.

A recently developed application for precipitated silica in colloidal form is in formulation of Chemical-Mechanical-Planarization (CMP) slurries used in polishing silicon wafers in the manufacture of computer chips and other electronic devices. U.S. Pat. Nos. 3,922,393, 4,260,396, 4,588,421, 5,100,581, 5,230,833, 5,527,423, 5,603,805, 5,860,848, and 5,891,205, as examples, teach the use of colloidal silica solutions with various concentrations, modifications and additives, which are particularly useful as chemical mechanical polishing slurries in the process of polishing and planarization of silicon wafers for the semiconductor industry.

As known in the art, CMP polishing slurries generally consist of a chemical agent which is corrosive to the material to be removed with a solution pH to cause controlled surface dissolution and some type of abrasive particles to mechanically remove material from the surface. It is also known that the electrical performance of the finished semiconductor chips can easily be affected by contaminates acquired by the wafers during processing. The use of silica slurries that are contaminated with trace transition metals, alkali and alkaline earth metals, aluminum, and the like have caused problems when used in wafer polishing. Contaminating metals of particular concern include alkali metals such as sodium (Na) and potassium (K), alkaline earth metals such as calcium (Ca) and magnesium (Mg), and transition metals such as iron (Fe), copper (Cu), manganese (Mn), nickel (Ni), zinc (Zn) and the like. Another metal which can cause difficulties is aluminum, particularly if Fe, Ni, Cu, Mn, or Cr are also present. If the metals are present in high enough concentrations, the CMP silica slurries often cannot meet the requirements for the final product.

It is generally agreed that CMP materials and solutions which come in contact with the wafer surface should have the lowest possible metals content to prevent possible contamination of the wafer and final chip product.

Precipitated silica particles in colloidal form for use as abrasives in CMP slurries are typically produced by acidification of commercial sodium silicate solutions, which are readily available. Commercial silicates are produced from the earth mined raw materials, sand and soda ash, by fusion at high temperatures in open hearth furnaces. This produces molten silicate glass, which is then cooled, fractured, and charged into vessels where it is dissolved under pressure by hot water and steam to form aqueous silicate solutions. Since the sand and soda ash raw materials contain various impurities found in the earth and the furnace insulation surfaces also transfer metal oxides, commercial silicates for industrial use, such as set forth above, generally contain metal contaminants in amounts from about 500 to 10,000 ppm which cause metal contamination as set forth below.

As known in the art, to minimize the possibility of metal contamination in or on the silicon wafers resulting from polishing operations, the manufacturers of CMP slurries have developed various treatment processes for metals removal from the silicate solutions and silica based CMP slurries. These expensive and time-consuming treatment processes, for example, include: treatment of the silica powder particles with acid to remove the metals while applying ultrasonic vibrations; hydrolyzing the silica compound containing the metals while in contact with a finely divided carbonaceous carrier on which the oxide is deposited and then separating the oxide from the carbon; removal of the counterions using ion exchange and then backadding ammonium hydroxide and ammonium carbonate to form stable products; diluting a colloidal silica slurry with water, then exposing it to a cation exchange resin in acid form to remove all sodium values, then adding oxalic acid to form an oxalate-containing low pH silicic acid, then exposing the silicic acid solution to an anion exchange resin in hydroxide form to replace all negatively charged species with hydroxide ions, then exposing the hydroxide-neutralized silicic acid solution to a cation exchange resin in acid form to replace all positively charged species with hydrated protons thereby forming a low metals silicic acid solution, then chilling, adding ammonium hydroxide for stabilization, heating, and reacting to form a dilute, low metals silica solution.

It is known that several CMP slurry manufacturers have attempted to develop colloidal silica slurries with lower metal impurities by obtaining high purity sand and soda ash raw materials for the production of microelectronic grades of sodium silicate. These attempts have resulted in lowering total metals contaminates to about the 250 ppm level, however, the costs have made it commercially unattractive. Another technique employed by some manufacturers includes the use of chelating agents in the slurry mixture to inhibit migration of metals to the wafer surface.

Commercially available rice hull currently is produced by gasification or by combustion or by incineration of rice hulls in a furnace. Gasification is the conversion of the hydrocarbon or carbohydrate components in a solid fuel into gases through the application to heat. Combustion is the act of process of burning or a chemical change, especially oxidation, accompanied by the production of heat and light. Incineration is the act of consuming by burning to ashes. Thermal pyrolysis is a chemical change that occurs in a substance through the application of heat. For convenience, the term "thermal pyrolysis" includes gasification, combustion, incineration, and any and all forms of heat which produces rice hull ash and amorphous carbon from rice hulls. Any process in which thermal pyrolysis is used to produce rice hull ash and amorphous carbon from rice hulls may be used in the present invention.

It has been recognized that certain agricultural byproducts or waste materials have varying quantities of biogenic silica, that is, silica which is developed, assimilated or occurs in the cell structures of living organisms such as plants. These byproducts, commonly referred to as "biomass", are principally rice hulls, rice straw, wheat straw, and sugarcane baggase. Other plants that contain biogenic silica, include equisetum ("horsetail weeds"), certain palm leaves ("palmyra palm"), and certain bamboo stems. The biogenic silica in these agricultural byproducts and plants lacks distinct crystalline structure, which means it is amorphous with some degree of porosity.

Dry rice hulls are comprised of about 60% cellulose and hemicellulose, 20% lignin, 19% silica, 0.5% nitrogen and sulfur, and 0.5% mineral elements such as phosphorus, magnesium, manganese, iron, potassium, sodium, aluminum, titanium, and calcium. When rice hulls are combusted, the solid material or ash remaining comprises about 20% of the starting quantity of hulls by weight and consists primarily of silica, minerals and any uncombusted carbon.

Dry sugarcane bagasse is typically comprised of about 6% sugar (carbohydrates) and 94% fibrous material (cellulose, hemicellulose, lignin, silica, and minerals). Chemical analyses of bagasse ash yields: 60–73% $SiO_2$, 3–6% $Al_2O_3$, 2–3% CaO, 5–6%, $Fe_2O_3$, 3–4% $K_2O$, 3–4% MgO, 3–4% $Na_2O$, 4–5% $P_2O_5$, and 4–17% uncombusted carbon.

Agricultural waste materials or biomass have potential useful fuel value and are used as low grade fuel to produce steam and electricity in a number of locations, especially near rice milling and sugarcane processing operations. Direct combustion and incineration have been utilized for many years as an expeditious method to dispose of rice hull waste. In the usual incineration of rice hulls, furnaces have been designed to operate at extremely high temperatures without regard to the form of silica produced by this incineration. The phase diagram of silicon dioxide indicates that a transition from the amorphous, non-crystalline form to the crystalline forms known as tridymite and crystobalite takes place at temperatures above 2000° F. (1093° C.) when the silica is in pure state. However, the incineration of biogenic material, such as rice hulls at temperatures in the 1800° F. to 2000° F. range for any prolonged exposure period, has lead to the formation of crystalline silica because the transition temperature from amorphous to crystalline is reduced by the pressure of other components of the original rice hulls.

U.S. Pat. Nos. 3,889,608 and 3,959,007 disclose a furnace and process for the incineration of biogenic material, such as rice hulls to produce useable energy and a highly reactive compounds form of silica in the ash. In the current incineration or direct combustion process, raw rice hulls are exposed to elevated temperature in an excess of air in the combustion zone of a cylindrical furnace, and the ash is continuously removed from the bottom. The hulls are incinerated at a gas mass temperature of between 1250° F. (677° C.) and 1500° F. (815° C.) at relatively high levels of turbulence under conditions whereby the temperature of the rice hulls does not exceed about 1300° F. (704° C.). Gas mass temperatures of between 1250° F. (677° C.) and 1350° F. (732° C.) are preferred when a crystalline free ash is desired. Upon leaving the furnace, the ash is rapidly cooled to provide ease in handling. The incineration or combustion of rice hulls and other biogenic materials are time-temperature related, and burning of them under these conditions produces biogenic ash, such as rice hull ash having carbon particles from the burning of the hulls which activates the carbon. Incineration of the hulls in this manner produces from about 3 percent to about 14 percent by weight of activated carbon. Also, when rice hulls and other biogenic materials are incinerated in this manner, the silica in the ash remains in a relatively pure amorphous state rather than in the crystalline forms known as quartz, tridymite, or crystobalite.

The significance of having the silica in an amorphous state is that the silica maintains a porous skeletal structure which provides better chemical reactivity and solubility during operations such as caustic digestion of the ash. From a safety standpoint, a commonly known health hazard which has been associated historically with the inhalation of crystalline silica dusts is silicosis. In 1997, a working group of the International Agency for Research on Cancer (IARC) published a monograph classifying inhaled crystalline silica from occupational sources as carcinogenic to humans, and categorized it as an IARC Group 1 agent. The Occupational Safety and Health Administration (OSHA) regulations and its OSHA Hazard Communication Standard, State right-to-know laws, and other applicable federal, state, and local laws and regulations on crystalline silica establish Permissible Exposure Limits (PELs) for airborne crystalline silica. OSHA has published general industry PELs for three different forms of crystalline silica. Cristobalite and tridymite are forms of crystalline silica, less abundant than quartz, that have lower PELs than quartz. These PELs for crystalline silica in general industry are listed in the "Code of Federal Regulations," 29 CFR 1910.1000, "Air Contaminants," under Table Z-3, "Mineral Dusts".

In the incineration process, all of the oxidation or combustion takes place rapidly and, typically in a single chamber where the biomass materials are placed in intimate contact with oxygen. This can result in competing reactions which can produce $NO_x$ (oxides of nitrogen), $SO_x$ (oxides of sulfur), and other compounds which are potential environmental contaminants. These and several other limitations have brought about development of gasification type combustion of biomass fuels. Biomass gasification involves the high temperature, about 1450° F. (788° C.), conversion of agricultural wastes, such as rice hulls and sugarcane bagasse, into combustible gases, such as hydrogen, carbon monoxide, methane, ethane and non-combustibles, such as carbon dioxide, water, and ash. The gases are then burned in a combustion chamber or in the radiant section of a boiler for production of steam and electricity. The ash is automatically and continuously discharged and cooled in its dry state. Components of the system normally include a two or three stage gasifier, boiler, steam turbine, generator, condenser and control system.

U.S. Pat. Nos. 4,517,905 and 4,589,355 disclose a gasifier where the carbon content of the ash residue from combustion of agricultural wastes, such as rice hulls, and the fly ash content of the gaseous exhaust are controlled. The combustion process is performed in a traditional manner using underfire and overfire air to support efficient gasification of the rice hulls or other feedstock, which results in production of a combustible gas mixture that is carried through a fire train to a boiler, steam turbine or other energy recovery system. A variable feed system, which when manipulated in conjunction with other variables, can produce ash with carbon contents from about 10% to the high 30% range. Operating instructions provide for control of the combustion chamber temperatures in the range of 1280° F. (693° C.) to 1460° F. (793° C.). The corresponding combustion gas (boiler feed) temperatures are in the range of 1360° F. (738° C.) to 1600° F. (871° C.). This combustion chamber temperature range is sufficient to devolatize rice hulls and allow partial combustion of some of the fixed carbon in the hulls. The specially designed feed system and temperature control mechanism permit the production of a dry, amorphous ash from rice hulls.

Any process in which thermal pyrolysis, including the aforementioned incineration, combustion, and gasification processes, is used to produce biogenic ash, such as rice hull ash and activated carbon from them may be used in the present invention. The biogenic silica is obtained by the controlled combustion of biogenic materials so that substantially all of the silica is in an amorphous rather than a crystalline state although minor amounts of crystalline silica can be present. While amorphous silica in the ash is preferred, some crystalline silica can be accommodated by manipulating caustic digestion variables such as temperature and pressure in the reaction. Generally, in the commercial burning of rice hulls as an energy source, the resulting ash includes about 0.5% to 1.0% of trace metals, such as magnesium, potassium, iron, aluminum, calcium, titanium, and manganese. The concentration of these metals is dependent upon the soil conditions and composition in which the rice plants and other biogenic materials are grown.

U.S. Pat. No. 5,833,940 discloses the production of liquid silicates from biogenic silica, by dissolving in a closed container biogenic silica, preferably rice hull ash, in a strong alkali solution, preferably sodium hydroxide in the presence of an active carbon material. The production of a caustic silicate solution, such as sodium silicate, from biogenic silica in rice hull ash is a caustic digestion process. Biogenic material ash, preferably, rice hull ash, with dispersed activated carbon is heated with a caustic solution, such as sodium hydroxide, which reacts with the amorphous silica to create sodium silicate solution. As mentioned previously, the carbon content in the rice hull ash or other biogenic material can approach the high 30% levels depending on the type of thermal pyrolysis used to burn them. The carbon is an inert material during the reaction and excess carbon is not harmful to the reaction. The principal caustic digestion chemical reaction is characterized as follows:

$$2\ NaOH + nSiO_2 + H_2O \rightarrow Na_2O:nSiO_2 + H_2O$$

where "n" represents the silica/alkali weight ratio

For the current industry standard sodium silicate liquid solution, the chemical equation becomes:

$$2\ NaOH + 3.22\ SiO_2 + H_2O \rightarrow Na_2O:3.22\ SiO_2 + H_2O$$

Present commercial grades of liquid sodium silicates not derived from rice hull ash range in silica/alkali weight ratios from about 1.6 to about 3.8. Such ratios are satisfactory for the rice hull ash and other biogenic ash derived liquid sodium silicate in the present invention.

As described in U.S. Pat. Nos. 5,714,000 and 5,858,911, activated carbon is generated in quantities ranging from about 3 percent to as much as 40 percent by weight in rice hull ash depending on the type of thermal pyrolysis utilized to burn rice hulls. During the caustic digestion of rice hull ash to produce sodium silicate solution, the biogenic silica reacts with the alkaline element (sodium oxide in the caustic solution) and becomes a soluble compound in the silicate solution. The activated carbon remains an inert material and becomes suspended solids in the silicate solution. Advantageously, it has been determined in the present invention, the compositions of the dilute, unfiltered sodium silicate liquids derived from caustic digestion of rice hull ash with carbon quantities in 3% to 40% by weight range, are ideally suited for the production of precipitated silicas with adhered or deposited amorphous carbons. In the event the carbon content of the biogenic ash or other biomass ash is too high for the intended end use, all of the activated carbon can be filtered out and the desired amount added to the caustic silicate solution prior to initiating the precipitation reaction. Specifically, the silica/alkali weight ratios ($SiO_2/Na_2O$), dissolved silicate solids ($Na_2O:nSiO_2$), suspended carbon particles and water quantities in the aqueous solutions are within the ranges necessary to provide commercial grade precipitated silicas with adhered or deposited amorphous carbons.

It would be highly desirable and advantageous to provide novel amorphous precipitated silicas and silica gels with amorphous carbon adhered or deposited on the silica in natural state rather than having to add carbon black to the amorphous precipitated silica.

It would also be highly desirable and advantageous to provide novel amorphous precipitated silica with the amorphous carbon filtered out and which has a low metal's content which prevents possible metals contamination by the CMP polishing slurry of the wafer and final chip product, thus providing an electronic grade amorphous silica.

It would be also highly desirable to provide amorphous carbons from a caustic silica solution produced by caustic digestion of biomass ash, preferably rice hull ash.

SUMMARY OF THE INVENTION

The present invention is directed to amorphous precipitated silicas, silica gels and amorphous carbons derived from biomass ash, preferably rice hull ash, and to a process for producing such silica compounds and carbons. More particularly, in one embodiment of the invention, the invention is directed to precipitated silica or silica gels with adhered or deposited amorphous carbons thereon in natural state, which utilize aqueous caustic silicate solutions of amorphous silica containing diffused carbon derived from caustic digestion of biogenic silica ash, preferably rice hull ash, from the thermal pyrolysis of rice hulls.

The process of this embodiment of the invention is the production of the precipitated silicas or silica gels wherein each silica type has the adhered or deposited amorphous carbons thereon by reacting acidification agents, such as strong mineral acids, with caustic silicate solutions of amorphous silica, such as liquid sodium silicate, containing diffused carbon derived from caustic digestion of biomass ash, such as rice hull ash, from the thermal pyrolysis of rice hulls.

In the embodiment of the invention in which precipitated silicas without adhered or deposited carbons, the carbon is not dissolved in the rice hull ash and other biogenic ash silicate solutions; therefore, it can be removed by conventional liquid/solids filtration or separation equipment as described in U.S. Pat. No. 5,714,000. Then, the activated carbon can be treated as disclosed in U.S. application Ser. No. 09/159,809 and pure silicas, without adhered or deposited carbon, can be produced from the clear caustic silicate solutions by the acidulation process to provide electronic grade silicas or lower metals content than those produced from commercial silicates.

As mentioned previously, the silica components are precipitated by acidifying the dilute aqueous caustic silicate solutions with or without diffused carbon, generally, by employing a strong mineral acid such as sulfuric acid or hydrochloric acid. Other strong mineral acids which may be used include; phosphoric acid, nitric acid, and acetic acid.

The manner in which the foregoing objects and other objects are achieved in accordance with the present invention will be better understood in view of the following detailed description and examples, which form a part of the specification.

DESCRIPTION OF PREFERRED EMBODIMENTS

One embodiment of the present invention are amorphous precipitated silicas or silica gels with adhered or deposited amorphous carbons separated from a slurry containing them, the slurry produced by acidifying a caustic silicate solution produced by caustic digestion of biomass ash containing silica and activated carbon. Advantageously and surprisingly, no additional carbon is necessary to be added to the precipitated silicas or silica gels for the industrial applications previously described.

In another embodiment of the invention, amorphous precipitated silicas or silica gels free of carbon separated from a slurry of them produced by acidifying a caustic silicate solution produced by caustic digestion of biomass ash containing silica and from which carbon has been filtered out, the precipitated silicas and silica gels having metal impurities that are less than half the concentration levels in precipitated silicas produced from commercial sodium silicate and, therefore, require significantly less treatment for metal impurities removal to make them suitable for CMP slurries used in polishing silicon wafers used in the manufacture of computer chips and other electronic devices.

In general the methods of the invention provide producing amorphous precipitated silicas, silica gels with and without adhered or deposited amorphous carbons comprising acidifying a caustic silicate solution produced by caustic digestion of a biomass ash, preferably rice hull ash, containing silica with or free of activated carbon, the acidifying effective to produce a slurry of the precipitated silicas and silica gels with or without the adhered or deposited amorphous carbons, and separating from the slurry the precipitated silicas and silica gels with or without the adhered or deposited amorphous carbons.

More particularly, the methods of the invention comprises reacting acidification agents with aqueous alkali metal silicates, such as sodium silicates, derived from caustic digestion of biomass ash, preferably rice hull ash, containing biogenic amorphous silica and activated carbon. The activated carbon passes through the caustic digestion of an inert material, therefore, it is not dissolved in the sodium silicate solution. When the unfiltered sodium silicate solutions, containing the diffused activated carbon particles, are reacted with acidulation agents, amorphous silica particles are precipitated and the activated carbon adheres to or deposits on the silica particles. If pure precipitated silica or silica gel products are desired, the carbon particles are removed from the biogenic sodium silicate solution by conventional filtration or separation equipment, prior to initiating the acidulation precipitation reaction.

Accordingly, one embodiment of the present invention utilizes the following process steps:

1. A measured quantity of biogenic sodium silicate solution derived from biomass is introduced into a suitable reactor vessel equipped with agitation, heating, and pH measurement capabilities. Prior to introduction, the properties and composition of the biogenic silicate solution, including sodium oxide ($Na_2O$) and silica ($SiO_2$) concentrations, $SiO_2/Na_2O$ ratio, $Na_2O:nSiO_2$ soluble solids, carbon suspended solids, water percent, specific gravity, and pH are determined by standard analytical methods known in the industry. These properties are important to achieve an overall chemical reaction balance regarding the quantity of acidification agent to utilize.

2. The solution is heated to a temperature range of 50° to 55° C. (122° to 131° F.) with agitation, while acidification is initiated by gradually adding the aqueous acid solution. Although any mineral acid may be used, either sulfuric acid or hydrochloric acid is preferred based on economic cost factors.

3. Acid addition is continued until about 70% of the initial sodium oxide ($Na_2O$) in the silicate solution is reacted, at which time a thick slurry is formed and gelling starts to occur. The acid addition time period to this point is normally about 22 to 38 minutes, depending on the silicate composition and acid strength. Also, the reaction mass pH can be used as a gelling indicator, since it will decrease from the initial starting range of 11.0 to 11.5 to the 8.0 to 9.0 range.

4. At this time, the acid addition is stopped and the reaction mass is aged for a period of 15 to 30 minutes, while maintaining agitation and a temperature of about 50° C. (122° F.). Acid addition is then continued at the previous rate until the pH is reduced to about the 3.4 to 4.2 range.

5. Acidification in this manner results in a pH of about 6.4 to 7.9, for a 5% solution of the final dried product in distilled water. While this pH range is suitable for most uses, adjustments can be made for more alkaline products (pH>8) by simply adding additional sodium silicate solution after acidification is completed.

6. The slurry is then processed through suitable solids/liquid separation equipment, such as a vacuum filter unit, centrifuge, or filter press for recovery of the wet solids or filter cake.

7. The wet solids or filter cake contain soluble salts; such as sodium sulfates, sodium chlorides, or sodium phosphates produced by the acid reaction with the alkali metal oxide component of the silicate, which are removed by washing with hot water at a temperature of about 60° C. (140° F.).

8. After washing, the wet solids or filter cake can be dried by any conventional drying methods and equipment, such as convection or radiant heaters, rotary drum dryers, spray dryers, etc.

9. The dry amorphous precipitated silica with adhered or deposited activated carbon particle sizes natural distribution from the dryer are about 62.5% smaller than 180 microns (−80 mesh) and 37.5% larger than 180 microns (+80 mesh). Milling, grinding, or pulverizing can be performed by any conventional size reduction equipment to produce smaller particle sizes as desired.

The amorphous precipitated silica with adhered or deposited carbon produced by the above described embodiment will commonly have properties as follows: The silica to carbon ratio (weight basis) will be in the range of about 1.20/1 to 14.7/1, the pH of a 5% solution will be about 6.38 to 7.88, the residual soluble salts after water washing will be about <10 ppm to 540 ppm, the bulk density will be about 17.48 to 28.71 pounds/cubic foot, the BET surface area will be about 155 to 267 $m^2/g$, and the DBP oil absorption will be about 129 to 223 ml/100 g.

Another embodiment of the present invention involves the production of pure precipitated silicas and silica gel without adhered or deposited amorphous carbons by acidification of the biogenic silicate solution derived from biomass after filtration removal of the carbon suspended solids. This embodiment of the present invention utilizes the following process steps:

1. The biogenic sodium silicate solution produced by caustic digestion of rice hull ash is pumped from the digestion reactor to a filter, such as a filter press, where the carbon suspended solids are separated from the liquid solution, thus yielding a clear, homogeneous filtrate free of unreacted silica and carbon solids.
2. Advantageously, the reactor used for caustic digestion, after appropriate clean-out, may be used for acidification of the filtered biogenic sodium silicate to produce pure precipitated silica or silica gel.
3. The filtered sodium silicate solution is then analyzed and treated in the same manner as outlined in process Steps 1 through 8 of the preceding first embodiment.
4. The dry, pure amorphous precipitated silica or silica gel (without adhered carbon) particle sizes natural distribution from the dryer are about 76% smaller than 180 microns (−80 mesh) and 24% larger than 180 microns (+80 mesh). Milling, grinding, or pulverizing can be performed by any conventional size reduction equipment to produce smaller particle sizes as desired.

The pure amorphous precipitated silica or silica gel produced by this second described embodiment will typically have properties as follows: the pH of a 5% solution will be about 7.1 to 7.8, the residual soluble salts after water washing will be about 60 ppm to 540 ppm, the bulk density will be about 21.04 to 29.46 pounds per cubic foot, the BET surface area will be about 205 to 287 $m^2/g$, and the DBP oil absorption will be about 171 to 239 ml/100 g.

As described in U.S. Pat. No. 4,157,920, precipitated silica produced by prior art methods from commercial sodium silicate solutions, which are useful as reinforcing fillers in rubber and elastomers, generally hold a high percentage of water, i.e., from about 70 to 85% in its wet filter cake. The percent moisture in the filter cake is known as percent wet cake moisture and generally abbreviated as "% WCM". The solid content of the filter cake is calculated by subtracting the % WCM from one hundred. This percent filter cake solids is generally abbreviated as "% FCS". When silicas, such as the prior art products holds a high percentage of water, i.e., from about 70 to 85%, they are known as high structure silicas. The amount of total structural water associated with 100 pounds of solid silica content of the filter cake is defined as "structure index" and abbreviated as S.I. The S.I. is calculated by the formula:

$$S.I. = \frac{\%WCM}{\%FCS} \times 100$$

The total structure moisture content of S.I is a very important property which is directly related to the functional and end use properties of silica. Prior art silicas, which are high structure silicas, have S.I.s in the range of 233 to 567. As stated, these silicas are useful as reinforcing fillers in elastomers and rubber. The amorphous precipitated silicas, with and without adhered or deposited carbon, of the present invention have S.I.s in the range of 315 to 382, indicative of high structure silicas suitable for reinforcing agents in rubber products, elastomers, and other polymeric compounds.

The composition of the biogenic sodium silicate utilizes in the precipitation reaction may vary widely without adverse effects. While not being limited thereto, the present preferred compositions and properties for liquid sodium silicates derived from rice hull ash having usefulness in this invention for production of amorphous precipitated silicas with adhered or deposited carbons are: $SiO_2/Na_2O$ ratios in the range of 2.5.1 to 3.85/1, $SiO_2$ concentrations in the range of 15% to 28%, $Na_2O$ concentrations in the range of 4.0% to 9.5%, $Na_2O:nSiO_2$ soluble solids in the range 18.0% to 38.5%, water concentrations in the range of 55.0% to 81.0%, suspended carbon solids in the range of 1.5% to 17.0%, solution specific gravity in the range of 1.128 to 1.300, solution densities in the range of 9.40 to 10.85 pounds per gallon, and pH in the range of 11.2 to 11.6.

The present invention is further and more particularly described in the following examples which are intended as illustrative only rather than limiting, since numerous modifications and variations will be apparent to those skilled in the art.

EXAMPLES

Examples 1–7 are directed to the production of precipitated amorphous silica with adhered or deposited carbon solids from a dilute sodium silicate solution derived from the caustic digestion of rice hull ash containing diffused activated carbon particles formed during the thermal pyrolysis of rice hulls. The results are provided in Table I following Example 7.

Example 1

This example illustrates the production of precipitated amorphous silica with adhered or deposited carbon solids from a dilute sodium silicate solution derived from the caustic digestion of rice hull ash (RHA) containing diffused activated carbon particles formed during the thermal pyrolysis of rice hulls. The RHA sodium silicate solution had the following properties: $SiO_2/Na_2O$ ratio at 3.27 to 1, Na:Si total soluble solids at 26.14% (6.12% $Na_2O$:0.02% $SiO_2$), diffused activated carbon at 10.25%, in a 63.61% water solution, specific gravity of 1.255 and density at 10.47 pounds per gallon, with a pH of 11.23. The acidulating agent utilized was concentrated sulfuric acid ($H_2SO_4$), 96.5% in aqueous solution.

In this example, a one liter laboratory reactor was used to produce the precipitated silica/carbon product. The reactor was equipped with a variable speed agitator, heater with temperature measurement and control, and pH measurement via electrode and meter. In this example and throught the specification, parts and percentages are by weight unless otherwise indicated.

The batch production steps includes a quantity of 100 ml (125.5. grams) of RHA sodium silicate solution was added to the reactor. A quantity of 573.5 ml (573.5 grams) of distilled water was added to the silicate solution and these components were agitated to achieve a homogeneous mixture. The resulting mixture comprised: 4.70% ([$Na_2O$:3.27 $SiO_2$]+1.84% carbon (suspended solids)+93.46% water. The pH of the mixture was 11.07. The mixture was agitated while heating to a temperature range of 50°–55° C. (122°–131° F.). While maintaining the temperature in the above range, 22.5 ml (39.55 grams) of concentrated $H_2SO_4$ acid were added to the reaction mass at a rate of 0.6 ml (1.05 grams) per minute over a time period of 38 minutes. Gel formation started to occur the addition of about 12 grams of acid at about 13 minutes elapsed time. The pH of the reaction mass was 8.30 when gelling was first observed. The gel became a black slurry with continued addition of the acid, agitation and heating to maintain the prescribed temperature range. At the end of the 38 minutes acid addition period, the black slurry, with a pH of 3.93, was allowed to age for complete precipitation reaction for a period of 15 minutes. After the aging period, 205 ml (257 grams) of the dilute RHA sodium silicate solution were added over a 20 minutes period (10 ml or 12.55 grams per minute) while continuing agitation and heating to maintain the 50°–55° C. temperature range. The above operations produced 990.5 grams of black slurry with a pH of 3.90. The material balance closure was minus 0.5% with 995.57 grams input and 990.5 grams output. The material loss was due to evaporation, handling and transfer losses.

Analysis of the unwashed black slurry on a CompuTrac liquid/solids analyzer revealed the slurry consisted of 18.25% dry solids and 81.75% liquid (180.76 grams dry solids and 809.73 grams liquid). Microscopic examination of the unwashed dry solids indicated distinct silica with attached carbon particles along with scattered white deposits. These deposits were most likely sodium sulfate produced by the $H_2SO_4$ and $Na_2O:3.27 SiO_2$ precipitation reaction. A solution of 5% unwashed dry solids in distilled water had a pH of 8.92 with an electrical conductivity of 1270 microSiemens/cm (uS/cm) which converts to 850 ppm total dissolved salts (TDS).

The black slurry was then filtered and the wet solids were washed with hot (55°–60° C.) distilled water for removal of the soluble salts such as sodium sulfate. A total quantity of hot water equal to 5 times the starting wet solids weight was utilized. This resulted in removal of essentially all the sodium sulfate in the solids.

The washed wet filter cake removed from the filter consisted of 20.73% dry silica/carbon solids and 79.27% water. This wet cake was dried in a standard convection oven at 110° C. for about 3 hours until constant weight was achieved.

The dry silica/carbon product was comprised of 66.1% amorphous precipitated silica and 33.9% activated carbon. A solution of 5% solids in distilled water had a pH of 6.95 and total dissolved salts of <10 ppm (<15 uS/cm conductivity). The bulk density was 0.30 g/ml (18.73 pounds per cubic foot). The product had a BET surface area of 220 $m^2/g$, a pore volume of 0.7707 ml/g, and an average pore diameter of 14.0 nanometers.

Example 2

This example illustrates the production of precipitated amorphous silica with adhered or deposited carbon solids from a sodium soluble solution containing a higher concentration of silicate soluble solids and less carbon suspended solids than that utilized in Example 1. The RHA sodium silicate solution had the following properties: $SiO_2/Na_2O$ ratio of 2.83 to 1, Na:Si total soluble solids at 36.97% (9.65% $Na_2$: 27.32% $SiO_2$), diffused activated carbon at 1.86%, in a 61.71% water solution, specific gravity of 1.289 and density at 10.75 pounds per gallon, with a pH of 11.43. The acidulating agent was sulfuric acid as used in Example 1.

The same laboratory reactor and equipment in Example 1 were again utilized in this example.

The batch production steps were essentially the same used in Example 1 except as follows. A quantity of 155 ml (200.21 grams) of RHA sodium silicate solution was added to the reactor. A quantity of 500 ml (500.53 grams) of distilled water was added to the silicate and the agitator was employed to obtain a homogeneous mixture. The resulting mixture comprised: 6.16%[$Na_2O:2.83 SiO_2$]+0.31% carbon (suspended solids)+93.53% water. The pH of this solution was 10.80. The mixture was agitated while heating to a temperature range of 50°–55° C. Sulfuric acid addition was started at a rate of 1.40 grams per minute. Gel formation started after addition of 12.64 grams and a thick gel occurred after addition of 16.36 grams of acid. The elapsed time was 19 minutes. The pH of the reaction mass was 8.94. Acid addition was stopped at this point and the black gel mixture was allowed to age for 15 minutes, while continuing agitation and heating to maintain 50°–55° C. temperature. After aging, acid addition was resumed at the same rate until a total of 27.12 grams were added. The total elapsed time for acid addition was 34 minutes. A black slurry was formed with pH in the range of 3.48–3.53. An additional 45.22 grams of RHA sodium silicate were added for pH adjustment. The above operations produced 763.19 grams of black slurry with material balance closure at minus 1.3% due to evaporation, handling, and transfer losses.

The black slurry was then filtered and the wet solids washed with hot distilled water (55°–60° C.) for removal of the soluble sodium sulfate salts. The washed filter cake consisted of 21.56% dry silica/carbon solids and 78.44% water.

The dry silica/carbon product was comprised of 93.6% amorphous precipitated silica and 6.4% activated carbon. A solution of 5% solids in distilled water had a pH of 6.38 and total dissolved salts of <10 ppm (<15 uS/cm conductivity). The bulk density was 0.37 g/ml (23.10 pounds per cubic foot). The product had a BET surface area of 155 $m^2/g$, a pore volume of 0.5429 ml/g, and an average pore diameter of 9.9 nanometers.

Example 3

This example illustrates the production of precipitated amorphous silica with adhered or deposited carbon solids from a sodium silicate solution containing a higher concentration of carbon suspended solids than those in Examples 1 and 2. The RHA sodium silicate solution had the following properties: $SiO_2/Na_2O$ ratio of 2.76 to 1, Na:Si soluble solids at 27.60% (7.33% $Na_2O:20.27\% SiO_2$), diffused activated carbon at 16.95%, in a 55.45% water solution, specific gravity of 1.298 and density at 10.83 pounds per gallon, with a pH of 11.51. The acidulating agent was sulfuric acid used in the previous examples.

The laboratory reactor and equipment used in previous examples were utilized in this example.

The batch production steps were as follows. A quantity of 892 ml (1157.92 grams) of RHA sodium silicate was added to the reactor. No distilled water was added to the silicate solution which comprised: 27.60%[$Na_2O:2.76SiO_2$]+ 16.95% carbon (suspended solids)+55.45% water. The pH was 11.51. The solution was agitated while heating to a temperature range of 50°–55° C. Sulfuric acid was added to a rate of 2.5 grams per minute while agitating. Gel formation started after addition of 55.50 grams and a thick gel occurred after addition of 69.77 grams of acid. The elapsed time was 28 minutes. The pH of the reaction mass was 8.46. Acid addition was stopped and the black gel mixture was allowed to age for 15 minutes, while continuing agitation and heating to maintain the temperature. After aging, acid addition was resumed at the same rate until a total of 115.86 grams were added. The total elapsed time for acid addition was 46 minutes. A black slurry was formed with a pH in the range of 3.43 to 3.67. These operations produced 1147.19 grams of black slurry with a material balance closure at minus 1.95% due to evaporation, handling and transfer losses.

The black slurry was then filtered and the wet solids washed with hot distilled water for the removal of the soluble sodium sulfate salts. The washed filter cake consisted of 22.45% dry solids and 77.55% water.

The dry silica/carbon product was comprised of 54.5% amorphous precipitated silica and 45.5% activated carbon. A solution of 5% solids in distilled water had a pH of 7.88 and total dissolved salts of 100 ppm (150 uS/cm conductivity). The bulk density was 0.31 g/ml (19.35 pounds per cubic foot). The product had a BET surface area of 267 $m^2/g$, a pore volume of 0.9347 ml/g, and an average pore diameter of 17.0 nanometers.

Example 4

This example illustrates the production of precipitated amorphous silica with adhered or deposited carbon from a dilute RHA sodium silicate solution utilizing 37% hydrochloric acid as the acidulating agent. The RHA sodium silicate solution had the following properties: $SiO_2/Na_2O$ ratio of 3.30 to 1 Na:Si soluble solids at 19.82% (4.61% $Na_2O$:15.21% $SiO_2$) diffused carbon (suspended solids) at 12.45%, in a 67.73% water solution, specific gravity of 1.278 and density at 10.66 pounds per gallon, with a pH of 11.35. The acidulating agent was 37% hydrochloric acid (HCl) in a water solution.

The laboratory reactor and equipment used in previous examples were utilized in this example.

The batch production steps were a quantity of 255 ml (200 grams) of RHA sodium silicate was added to the reactor. A quantity of 500 ml (500 grams) of distilled water was added to the silicate solution and these were agitated while heating to a temperature range of 50°–55° C. The resulting mixture comprised: 5.67%[$Na_2O$:3.30$SiO_2$]+3.56% carbon suspended solids+90.78% water. The pH of the mixture was 10.85. While maintaining the temperature of 50°–55° C. with agitation and heating, 37% HCl was added at the rate of 1.85 grams per minute in a 22 minute time period. Gel formation started after the addition of 40.8 grams of acid with the reaction mass pH at 8.44. At this point acid addition was stopped and the black gel mixture was allowed to age for 15 minutes. After aging, acid addition was resumed at the same rate until a total of 60.8 grams had been added. The pH of the reaction mass was 2.85. An additional quantity of 122.8 grams of the RHA sodium silicate was added to adjust the pH to 6.06. These operations produced 883.8 grams of unwashed black slurry with a material balance closure of minus 1.37% due to evaporation, handling and transfer losses.

The black slurry was then filtered and the wet solids washed with hot water to remove residual sodium chloride salts produced by the acid reaction with sodium silicate. The washed filter cake consisted of 23.56% dry solids and 76.44% water.

The dry silica/carbon product was comprised of 55.0% amorphous precipitated silica and 45.0% activated carbon. A solution of 5% solids in distilled water had a pH of 7.75 and total dissolved salts of 540 ppm (810 uS/cm conductivity). The bulk density was 0.276 g/ml (17.23 pounds per cubic foot). The product had a BET surface area of 264 $m^2/g$, a pore volume of 0.9255 ml/g, and an average pore diameter of 16.8 nanometers.

Example 5

This example illustrates the production of precipitated amorphous silica with adhered or deposited carbon from a dilute RHA sodium silicate solution utilizing sulfuric acid as the acidulating agent and slightly different concentration of suspended carbon solids in the starting silicate solution. The RHA sodium silicate solution had the following properties: $SiO_2/Na_2O$ ratio of 2.93 to 1, Na:Si soluble solids at 29.75% (7.57%$Na_2O$:22.18%$SiO_2$), diffused carbon (suspended solids) at 8.15%, in a 62.10% water solution, specific gravity of 1.266 and density at 10.56 pounds per gallon, with a pH of 11.41.

The laboratory reactor and equipment used in previous examples were utilized in this example.

The batch production steps were a quantity of 900 ml (1139 grams) of RHA sodium silicate was added to the reactor. No distilled water was added to the silicate solution which comprised: 29.75%[$Na_2O$:2.93$SiO_2$]+8.15% carbon (suspended solids)+62.10% water. The pH was 11.51. The solution was agitated while heating to a temperature range of 50°–55° C. (122°–131° F.). Sulfuric acid was added at a rate of 3.0 grams per minute while agitating. Gel formation started after addition of 50 gram and a thick gel occurred after addition of 70 grams of acid. The elapsed time was 23 minutes. The pH of the reaction mass was 8.35. At this point, acid addition was stopped and the black gel mixture was allowed to age for 15 to 20 minutes. After aging, acid addition was resumed at the same rate until a total of 96 grams had been added. The pH of the reaction mass was 4.15 An additional 131 grams of RHA sodium silicate was added to adjust the pH to 6.95. These operations produced 1346 grams of unwashed black slurry with a material balance closure of minus 1.46% due to evaporation, handling and transfer losses.

The black slurry was then filtered and the wet solids washed with hot water to remove the sodium sulfate salts produced by the acid reaction with sodium silicate. The washed filter cake consisted of 24.12% dry solids and 75.88% water.

The dry silica with adhered carbon product was comprised of 73.1% amorphous precipitated silica and 26.9% activated carbon. A solution of 5% solids in distilled water had a pH of 6.86 and total dissolved salts of <10 ppm (<15 uS/cm conductivity). The bulk density was 0.300 g/ml (18.73 pounds per cubic foot. The product had a BET surface area of 199 $m^2/g$, a pore volume of 0.6954 ml/g, and an average pore diameter of 9.0 nanometers.

Example 6

This example illustrates the production of precipitated amorphous silica with adhered or deposited carbon from a dilute RHA sodium silicate solution utilizing 85% o-phosphoric acid as the acidulating agent. The RHA sodium silicate solution had the following properties: $SiO_2/Na_2O$ ratio of 3.16 to 1, Na:Si soluble solids in 28.38% (6.82%$Na_2O$:21.56%$SiO_2$), diffused carbon (suspended solids) at 7.38%, in a 64.24% water solution, specific gravity of 1.265 and density of 10.55 pounds per gallon, with a pH of 11.57.

The laboratory reactor and equipment used in previous examples were utilized in this example.

The batch production steps were a quantity of 200 ml (253 grams) of RHA sodium silicate was added to the reactor. A quantity of 400 ml (400 grams) of distilled water were added to the silicate solution and these were agitated while heating to a temperature of 50° C. (122° F.). The resulting mixture comprised: 10.99%[Na$_2$O:3.16SiO$_2$]+2.86% carbon suspended solids+86.15% water. The pH of the mixture was 11.30. While maintaining the temperature at 50° C. with agitation and heating, 85% H$_3$PO$_4$ was added at the rate of 1.10 grams per minute in a 15 minutes time period. Gel formation stated after addition of 16 grams of acid with reaction mass pH at 8.97. At this point acid addition was stopped and the black gel was stirred and aged for 10 minutes. After aging, acid addition was resumed at the same rate until a total of about 28 grams had been added. The pH of the reaction mass was 7.03. The mass was aged for 30 minutes while stirring before filtration was initiated. These operations produced 665 grams of unwashed black slurry with a material balance closure of minus 2.35% due to evaporation, handling and transfer losses.

The black slurry was then filtered and the wet solids washed with hot water to remove the sodium phosphate salts produced by the acid reaction with sodium silicate. The washed filter cake consisted of 22.56% dry solids and 77.44% water.

The dry silica/carbon product was comprised of 74.5% amorphous precipitated silica and 25.5% activated carbon. A solution of 5% solids in distilled water had a pH of 7.34 and total dissolved salts of 480 ppm (720 uS/cm conductivity). The bulk density was 0.461 g/ml (28.77 pounds per cubic The batch production steps were the reactor was initially loaded with 16.74 kg (36.91 lbs.) of RHA sodium silicate solution while agitating and heating to 55° C. (131° F.). After reaching the reaction temperature, the phosphoric acid was added at the rate of 0.14 kg per minute (0.31 lbs/min) in a 15 minutes time period. Gel formation was observed at this time and the acid addition was stopped. The pH of the reaction mass was 7.13. The black gel was aged for 30 minutes with agitation at 55° C. These operations produced 18.8 (8.53 lbs) of unwashed black slurry. The black slurry was then transferred to the membrane filter unit and washed with hot water until the sodium phosphate salts were essentially removed. The pH was 7.65 and the total dissolved salts were <200 ppm. The washed filter cake consisted of 23.55% dry solids and 76.45% water. The washed solids were then vacuumed filtered and dried in a convection oven at 110° C. for 3 to 4 hours.

The dry silica/carbon product was comprised of 75.28% amorphous precipitated silica and 24.72% activated carbon. A solution of 5% solids in distilled water had a pH of 7.55 and total dissolved salts of 160 ppm (230 uS/cm conductivity). The bulk density was 0.441 g/ml (27.56 pounds per cubic foot). The product had a BET surface area of 193 m$^2$/g, a pore volume of 0.6762 ml/g, and an average pore diameter of 12.3 nanometers.

TABLE 1

PRECIPITATED SILICA WITH ADHERED CARBON PROPERTIES

| Property | Example 1 | Example 2 | Example 3 | Example 4 | Example 5 | Example 6 | Example 7 |
|---|---|---|---|---|---|---|---|
| Silica wt % | 66.14 | 93.63 | 54.50 | 54.99 | 73.13 | 74.49 | 75.28 |
| Carbon wt % | 33.86 | 6.37 | 45.50 | 45.01 | 26.87 | 25.51 | 24.72 |
| Silica/Carbon Ratio | 1.95/1 | 14.7/1 | 1.20/1 | 1.22/1 | 2.72/1 | 2.92/1 | 3.05/1 |
| Wet Cake Moisture, WCM % | 79.27 | 78.44 | 77.55 | 76.44 | 75.88 | 77.44 | 76.45 |
| Filter Cake Solids, FCS % | 20.73 | 21.56 | 22.45 | 23.56 | 24.12 | 22.56 | 23.55 |
| Structure Index (WCM/FCS × 100) | 382 | 364 | 345 | 324 | 315 | 343 | 325 |
| pH | 6.95 | 6.38 | 7.88 | 7.75 | 6.95 | 7.34 | 7.55 |
| Total dissolved salts, ppm | <10 | <10 | 100 | 540 | <10 | 480 | 160 |
| Conductivity, uS/cm | <15 | <15 | 150 | 810 | <15 | 720 | 230 |
| Bulk density, g/ml | 0.30 | 0.37 | 0.31 | 0.28 | 0.30 | 0.46 | 0.44 |
| PCF pounds/cubic foot | 18.73 | 23.10 | 19.35 | 17.48 | 18.73 | 28.71 | 27.46 |
| BET surface area, m$^2$/g | 220 | 155 | 267 | 264 | 199 | 195 | 193 |
| Pore volume, ml/g | 0.7707 | 0.5429 | 0.9347 | 0.9255 | 0.6964 | 0.6833 | 0.6762 |
| Average pore diameter, nm | 14.0 | 9.9 | 17.0 | 16.8 | 9.0 | 12.4 | 12.3 |
| DBP absorption, ml/100 g | 183 | 129 | 223 | 220 | 166 | 163 | 161 | foot). The product had a BET surface area of 195 m$^2$/g, a pore volume of 0.6833 ml/g, and an average pore diameter of 12.4 nanometers.

Example 7

This example illustrates the production of precipitated amorphous silica with adhered or deposited carbon from a dilute RHA sodium silicate solution utilizing a larger bench sized reactor of about 19 liters volume (5 gallons) and a membrane filter unit. The purpose was to obtain information on scale-up factors for commercial equipment design and selection. The reactor was equipped with a variable speed mixer and electric heating bands for temperature control. The RHA sodium silicate solution had the following properties: SiO$_2$/Na$_2$O ratio of 2.12 to 1, Na:Si soluble solids at 24.09% (5.85%Na$_2$O:18.24%SiO$_2$), diffused carbon suspended solids at 6.00%, in a 69.91% water solution, specific gravity of 1.213 and density of 10.12 pounds per gallon, with a pH of 11.28. The acidifying agent was 85% o-phosphoric acid.

Examples 8–10 are directed to the production of precipitated amorphous silica without adhered or deposited carbon solids from dilute sodium silicate solution derived from caustic digestion of rice hull ash after the diffused activated carbon particles have been removed by filtration. The results are provided in Table 2 following Example 10.

Example 8

This example illustrates the production of pure precipitated amorphous silica without adhered or deposited amorphous carbon. A RHA sodium silicate liquid sample was filtered to remove all the carbon suspended solids prior to acidification. The clear, dilute sodium silicate solution had the following properties: SiO$_2$/Na$_2$O ratio at 3.02 to 1, Na:Si total soluble solids at 28.71% (7.14%N$_2$O:21.57%SiO$_2$), in a 71.29% water solution, specific gravity of 1.245 and density at 10.38 pounds per gallon, with a pH of 11.46. The acidulating agent utilized was concentrated sulfuric acid, 96.5% in aqueous solution.

The laboratory reactor and equipment used in Example 1 were utilized to produce the pure precipitated silica product.

The batch production steps included a quantity of 100 ml (124.5 grams) of clear dilute RHA sodium silicate solution were added to the reactor. A quantity of 573 ml (573 grams) of distilled water were added to the silicate solution and the agitator was started while heating to 50°–55° C. (122°–131° F.). The resulting mixture comprised: 5.12% [$Na_2O:3.02SiO_2$]+94.88% water. While maintaining agitation and temperature in the above range, sulfuric acid was added at the rate of 2.68 grams per minute over a 37 minutes period. The acid addition was stopped and the white gel was allowed to age for 15 minutes. The slurry pH was 2.34. Additional clear sodium silicate was added at the rate of 13.25 grams per minute for a 45 minutes period to adjust the pH to 7.49. The white slurry was then allowed to age for a period of 20 minutes while agitating. The above operations produced 1399 grams of white slurry with a pH of 7.58.

The white slurry was then filtered and washed with hot water to remove the sodium sulfate salts. The washed filter cake consisted of 22.42% dry solids and 77.58% water.

The wet precipitated silica product was dried in a convection oven for about 5 hours at 110° C. A solution of 5% solids in distilled water had a pH of 7.84 and total dissolved salts of 60 ppm (90 uS/cm conductivity). The bulk density was 0.337 g/ml (21.04 pounds per cubic foot). The product had a BET surface area of 205 $m^2$/g, a pore volume of 0.7181 ml/g, and an average pore diameter of 13.0 nanometers.

Example 9

This example illustrates the production of pure precipitated amorphous silica without adhered or deposited amorphous carbon utilizing phosphoric acid for acidification of a clear, dilute sodium silicate after filtration removal of the suspended carbon solids. The clear, dilute sodium silicate solution had the following properties: $SiO_2/Na_2O$ ratio of 3.85 to 1, Na:Si total soluble solids at 18.97% (3.91%$Na_2O$:15.06%$SiO_2$), in a 81.03% water solution, specific gravity of 1.128 and density at 9.41 pounds per gallon, with a pH of 11.27.

The laboratory reactor and equipment were utilized in this example.

The batch production steps were a quantity of 230 ml (259 grams) of clear dilute RHA sodium silicate were added to the reactor with agitation and heating to 50° C. Phosphoric acid was added to 2.25 grams per minute over a 15 minutes period. Gel formation was observed at the end of the period and the pH was 6.89. The white gel was allowed to age for a 20 minutes period while agitating and heating. The above operations produced 293 grams of white slurry with a pH of 6.95.

The white slurry was then filtered, washed with hot water to remove sodium phosphate salts, and dried in a convection oven. The washed filter cake consisted of 23.62% dry solids and 76.38% water.

A 5% solution of dry precipitated silica in distilled water had a pH of 7.23 and total dissolved salts of 540 ppm (810 uS/cm conductivity). The bulk density was 0.472 g/ml (29.46 pounds per cubic foot). The precipitated silica product had a BET surface area of 287 $m^2$/g, a pore volume of 0.9943 ml/g, and an average pore diameter of 18.0 nanometers.

Example 10

This example illustrates the production of pure precipitated amorphous silica without adhered or deposited amorphous carbon utilizing hydrochloric acid for acidification of a clear, dilute sodium silicate after filtration removal of the suspended carbon solids. The clear, dilute sodium silicate solution had the following properties: $SiO_2/Na_2O$ ratio of 2.77 to 1, Na:Si total soluble solids at 29.05% (7.71%$Na_2O$:21.34%$SiO_2$), in a 70.95% water solution, specific gravity of 1.205 and density at 10.05 pounds per gallon, with a pH of 11.38.

The laboratory reactor and equipment were utilized in this example.

The batch production steps were a quantity of 200 grams of clear dilute RHA sodium silicate were added to the reactor with agitation and heating to 50° C. Hydrochloric acid was added at 1.0 grams per minute for 27 minutes, at which time the first gel formation was observed. The reaction mass pH was 9.04. The mass was allowed to age under agitation for 15 minutes. An additional 52 grams of dilute sodium silicate were added while agitating and maintaining temperature at 50° C. An additional 11 grams of hydrochloric acid were added to adjust pH to 5.91. The white slurry was allowed to age for 60 minutes prior to filtration. The above operations produced 290 grams of white slurry with a pH of 6.17.

The white slurry was filtered, washed with hot water to remove the sodium chloride salts, and dried in a convection oven. The washed filter cake consisted of 24.12% dry solids and 75.88% water.

A 5% solution of dry precipitated silica in distilled water had a pH of 7.09 and total dissolved salts of 380 ppm (570 uS/cm conductivity). The bulk density was 0.4194 g/ml (26.12 pounds per cubic foot). The precipitated silica product had a BET surface area of 258 $m^2$/g, a pore volume of 0.8990 ml/g, and an average pore diameter of 16.0 nanomaters.

TABLE 2

PRECIPITATED SILICA
WITHOUT ADHERED CARBON PROPERTIES

| Property | Example 8 | Example 9 | Example 10 |
|---|---|---|---|
| Silica wt % | 100 | 100 | 100 |
| Wet Cake Moisture, WCM % | 77.58 | 76.38 | 75.88 |
| Filter Cake Solids, FCS % | 22.42 | 23.62 | 24.12 |
| Structure Index (WCM/FCS × 100) | 346 | 323 | 315 |
| pH | 7.84 | 7.23 | 7.09 |
| Total dissolved salts, ppm | 60 | 540 | 380 |
| Conductivity, uS/cm | 90 | 810 | 570 |
| Bulk density, g/ml | 0.337 | 0.472 | 0.419 |
| PCF pounds/cubic foot | 21.04 | 29.46 | 26.15 |
| BET surface area, $m^2$/g | 205 | 287 | 258 |
| Pore volume, ml/g | 0.7181 | 0.9943 | 0.8990 |
| Average pore diameter, nm | 13.0 | 18.0 | 16.0 |
| DBP absorption, ml/100 g | 171 | 239 | 215 |

Precipitated silica solutions for potential use in CMP polishing slurries were formulated by mixing the pure precipitated silica particles obtained by acidifying sodium silicate solutions derived from caustic digestion of biomass ash (rice hull ash), with appropriate quantities of deionized water. Metal analyses were conducted by Ion Coupled Argon Plasma (ICP) and the results are compared to two commercially available CMP slurries, designated A and B in Table 3. It is noted that the commercial CMP slurries contain silica precipitated from commercial sodium silicates and were further processed through ion exchange resins to remove metal contaminants, while the Examples 11, 12 and 13 samples were precipitated from sodium silicate solutions derived from the caustic digestion of rice hull ash and were not treated by any metals removal technique. In other words, the Examples 11, 12 and 13 silica slurries contain the metals that were present in the starting rice hull ash raw materials, since no metals removal treatments were employed. The ICP analytical results were adjusted to equalize the silica composition of the slurries and are reported in parts-per-million, ppm.

TABLE 3

Metals Analyses Results - CMP slurries

| Metals | Example 11 | Example 12 | Example 13 | Commercial A | Commercial B |
|---|---|---|---|---|---|
| Na | 19.8 | 18.6 | 18.7 | 19.4 | 20.1 |
| Ca | 22.9 | 23.1 | 19.9 | 12.8 | 13.2 |
| Mg | 3.8 | 4.9 | 2.2 | 9.4 | 9.7 |
| Al | 34.0 | 28.0 | 26.0 | 87.0 | 90.0 |
| Cr | 0.1 | 0.2 | 0.2 | 0.6 | 0.5 |
| Cu | 0.1 | 0.1 | 0.1 | 4.3 | 4.1 |
| Fe | 3.3 | 2.9 | 2.2 | 23.4 | 16.2 |
| K | 4.7 | 3.6 | 3.5 | 4.7 | 4.1 |
| Sn | 0.3 | 0.7 | 0.5 | 1.8 | 1.5 |
| Sr | 0.3 | 0.2 | 0.1 | 0.6 | 0.5 |
| Ti | 1.3 | 1.5 | 1.1 | 72.8 | 75.3 |
| Zn | 6.3 | 4.5 | 4.8 | 1.6 | 1.3 |
| Zr | 0.5 | 0.4 | 0.1 | 17.2 | 14.3 |
| Totals | 97.4 | 88.7 | 79.4 | 255.6 | 250.8 |

These results clearly show that the precipitated silicas produced from sodium silicate solutions derived from caustic digestion of biomass ash (rice hull ash) have metals impurities that are less than half the concentration levels in silicas produced from commercial sodium silicate solutions. The biomass ash derived sodium silicates produced precipitated silicas have 260% to 319% lower metals content, without any further removal treatments being employed.

Other agricultural byproducts or waste materials having varying quantities of biogenic silica, that is, silica which is developed, assimilated or occurs in the cell structures of living organisms such as plants are useful in the present invention. As previously mentioned, these products are commonly referred to as biomass and are principally rice hulls, rice, straw, wheat straw, sugarcane, bagasse, esquisitum (horsetail weeds), certain palm leaves (palmyra palm), and bamboo stems processed the same as in Examples 1–10 produce satisfactory amorphous silicas, silica gels, with (Examples 1–7) or without (Examples 1–10) adhered or deposited amorphous carbons for the particular uses of them as previously set forth herein.

Accordingly, the present invention is well suited and adapted to attain the ends and carry out the objects set forth and has the advantages and features mentioned as well as others inherent therein.

While presently preferred examples of the embodiments of the invention have been given for the purposes of disclosure, changes can be made therein which are within the spirit of the invention as defined by the scope of appended claims.

What is claimed is:

1. A reaction product precipitate of amorphous pyrolized biomass silica or biomass silica gel wherein each silica has adhered or deposited amorphous carbon in natural state, said precipitate produced by acidification of a caustic silicate solution of the biomass ash containing the biomass silica and amorphous carbon.

2. The precipitate of amorphous pyrolized biomass silica or biomass silica gel or claim 1, where,
   the biomass ash comprises rice hull ash.

3. A reaction product precipitate of amorphous pyrolized biomass silica or biomass silica gel wherein each silica type is free of amorphous carbon, said precipitate produced by acidification of a caustic silicate solution of the biomass ash containing silica and the amorphous carbon,
   the precipitated biomass silica and biomass silica gel having total metal contaminants not exceeding about 250 ppm.

4. The reaction product precipitate of pyrolized biomass silica or biomass silica gel of claim 3 where,
   the biomass ash comprises rice hull ash.

* * * * *